May 8, 1951  S. P. ROBINSON  2,551,905
DESULFURIZATION OF GASES
Filed April 29, 1946
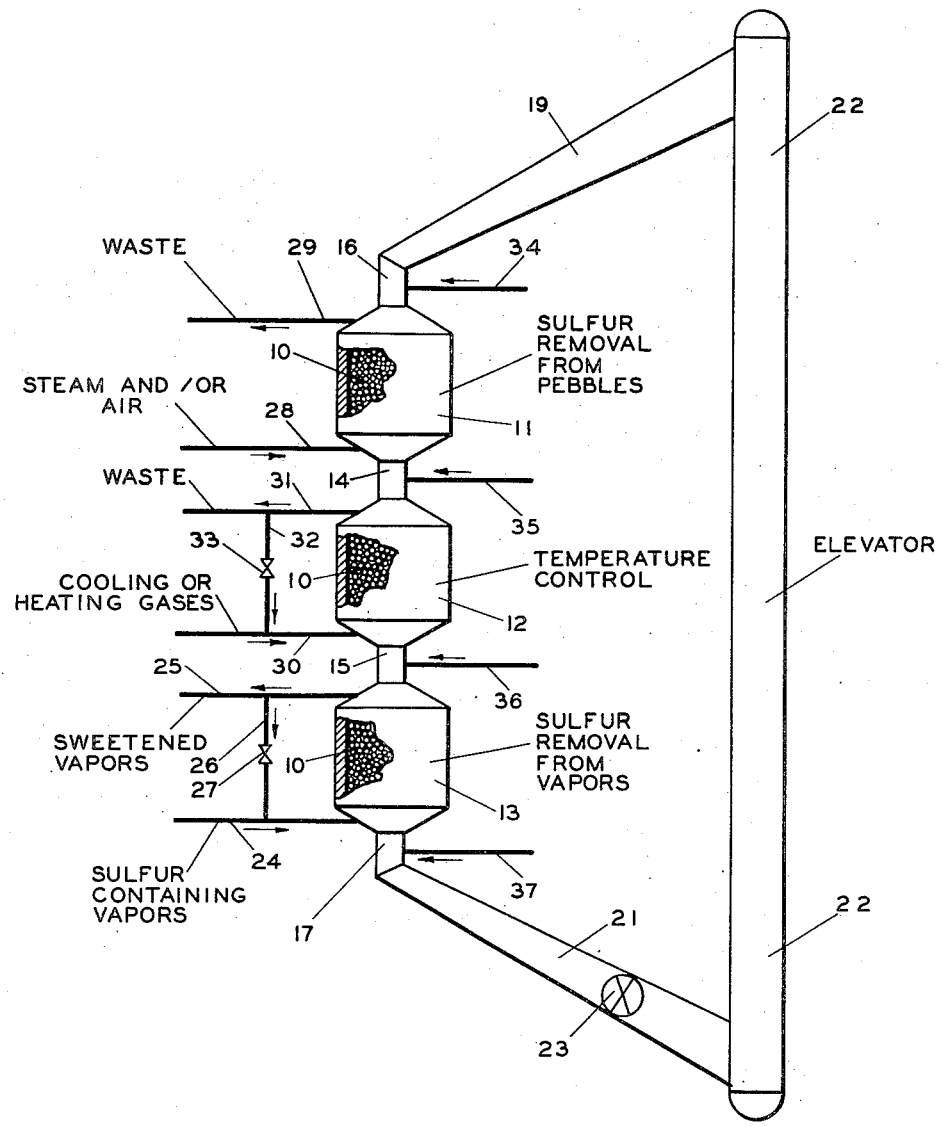
INVENTOR.
SAM P. ROBINSON
BY Hudson & Young
ATTORNEYS Patented May 8, 1951

2,551,905

UNITED STATES PATENT OFFICE 2,551,905

DESULFURIZATION OF GASES

Sam P. Robinson, Bartlesville, Okla., assignor to Phillips Petroleum Company, a corporation of Delaware Application April 29, 1946, Serial No. 665,673

10 Claims. (Cl. 23—2)

This invention relates to the treatment of gases and vapors containing sulfur compounds. In one specific embodiment the invention pertains to a continuous process for desulfurizing hydrocarbon gases containing sulfur compounds.

It is an object of this invention to provide an improved process for the removal of sulfur from gases and vapors containing organic sulfur compounds and hydrogen sulfide.

A further object of the invention is to provide a continuous process for desulfurizing hydrocarbon gases containing combined sulfur.

Other objects of the invention will become apparent from the accompanying description.

The process of the invention is applicable to various types of non-hydrocarbon gases containing sulfur compounds, such as hydrogen, carbon monoride, mixtures of hydrogen and carbon monoxide, and industrial process gases from coke oven, Fischer-Tropsch, synol, water-gas, etc., as well as to hydrocarbon gases. Hydrocarbons which are amenable to treatment by the process of the invention include those which contain organic sulfur compounds and/or hydrogen sulfide and which either are gaseous or can be substantially entirely vaporized without undergoing incipient cracking of the oil up to temperatures of about 900° F. Such hydrocarbons include natural gas, naphthas, gasolines, kerosenes, distillate fuels, gas oils, distilled lubricating oils, thermally and catalytically cracked hydrocarbon oils and vapors, etc. The hydrocarbons may have been previously subjected to other treatments such as distillation, solvent extraction, acid treatment, caustic treatment, and/or washing with water.

The process of the invention is carried out in a three-chamber pebble heater type apparatus. Heat-conducting catalytic pebbles are flowed by gravity thru three vertically spaced chambers. In the lowest or reaction chamber a stream of the hydrocarbon feed to be desulfurized is continuously contacted with hot pebbles flowing down thru this chamber from a temperature regulating chamber above. The pebbles comprise a mixture of catalytic material and an oxide of a metal which accepts sulfur. The catalytic material hastens the decomposition of sulfur compounds and the metal oxide serves as an acceptor for the sulfur, thus continuously removing sulfur from the gases being treated and forming metal sulfide on the pebbles.

As the pebbles emerge from the reaction chamber they are more or less deactivated according to the length of contact with gases being treated and the amount of sulfur present in the feed. They are then elevated to the highest chamber in the system which is a regeneration chamber, and there contacted in a stream with a countercurrently flowing stream of hot oxygen-containing gas, such as air or air mixed with steam, at a temperature of between about 750° and 1200° F. In this manner the metal sulfide formed on the pebbles in the reaction zone is converted to metal oxide and the pebbles are ready for tempering which is conveniently effected in a chamber directly beneath the regeneration chamber. Since conversion of a metal sulfide to a metal oxide is an exothermic reaction, a considerable portion or all of the heat requirements of the desulfurization process are supplied in the regeneration zone. Thus it is that when treating a slightly "sour" gas, the pebbles usually emerge from the regeneration zone at a temperature below that required to maintain the desired temperature in the reaction zone and when treating an extremely "sour" gas, sufficient heat is developed in the regeneration zone to raise pebble temperature to above that required in the reaction zone. On some occasions the temperature of pebbles emerging from the regeneration zone is just sufficient to adequately maintain the proper temperature in the reaction zone.

Hence, in practically all cases, it is imperative to either increase or decrease the temperature of the pebbles between their exit from the regeneration zone and their introduction to the reaction zone. This tempering of the pebbles is most advantageously accomplished by flowing them by gravity thru a chamber intermediate the other two chambers in contact with an upwardly flowing stream of gas of the temperature required to quickly adjust pebble temperature to that desired in the reaction zone. The tempering gas may be any non-deleterious gas of sufficient heat capacity but it is desirable to use air, flue gas, superheated steam, and mixtures thereof. The temperature desired in the reaction zone and the temperature of the pebbles entering this tempering zone will largely determine the temperature of the tempering gas. With reaction temperature varying from about 400° to 900° F., it is necessary to so regulate the temperature of the tempering gas that the pebbles are brought to a temperature of at least about 450° F. and preferably not above about 1200° F. while passing thru the tempering zone.

The term pebble as used thruout this specification denotes any refractory material in fluent form and size which will flow readily by gravity thru the various chambers of a pebble heater apparatus. Pebbles are preferably substantially spherical and are about 1/8" to 1" in diameter with the preferred range from about 1/4" to 1/2".

The invention requires the circulation thru the reaction zone of pebbles which are catalytic in decomposing sulfur compounds and which also remove sulfur from the decomposed gases. A large group of materials are known to be catalytic in decomposing sulfur compounds and a number of them operate desirably in the process of the invention. These include aluminous materials, such as natural and acid treated clays, bauxite, synthetic silica-alumina gels, silica gel, alumina gel, various iron ores, iron oxides, magnesite, magnesium oxide, chromite, chromium oxide, vanadite, vanadium oxide, molybdenite, molybdite, molybdenum oxide, wolframite, and tungsten oxide. Some of these materials require more or less binder in order to form them into durable pebbles; others require only heat and pressure to form them into rugged, refractory pebbles.

The other pebble material required in the continuous process of the invention consists of oxides of metals which accept sulfur from the decomposition products of the reaction zone and are comparatively readily regenerable as sulfur acceptors. Oxides of Fe, Ni, Cu, Cd, Zn, Ca, Ba, Mg, Na, and K readily accept sulfur in the range of temperature from about 400° to 900° F. and are relatively easily regenerable in an oxygen atmosphere at temperatures in the range of about 750° to 1200° F.

A number of variations of pebble composition and arrangement are feasible within the scope of the invention. One type of pebble containing both a catalytic material and a sulfur acceptor is conducive of excellent results in the process, e. g., a pebble consisting of a mixture of bauxite and iron oxide properly formed and heat treated provides excellent heat-transfer, catalytic, and sulfur acceptor properties and is very durable. Other metal oxide sulfur acceptors may be incorporated in the pebbles along with iron oxide. Likewise, clays such as bentonite, sub-bentonite, fuller's earth, etc., when mixed with one or more of the sulfur acceptors named and formed into hard rugged pebbles, operate very efficiently in the process. Metal oxide sulfur acceptors may be mixed with the catalytic material in solid form or by impregnation with metal salt solutions convertible to the oxide upon heating. The proportions of catalyst to acceptor may be varied within wide limits to suit the conditions of operation and the type of feed being desulfurized as well as to suit the characteristics of the individual materials comprising the pebbles. In general the proportion of catalytic material should be from about 15% to 60% of the pebble while the sulfur acceptor occupies from about 40% to 85% by weight of the pebble. A pebble consisting of about 35% bauxite and 65% iron oxide functions effectively as a desulfurization material.

Another modification can be practiced by using two different kinds of pebbles in varying proportions, e. g., alumina (bauxite) pebbles and iron oxide pebbles may be mixed and circulated thru the pebble heater system to produce desirable results. Each type of pebble will perform its function in the process independently of the other. The two types of pebbles may be of the same or different sizes.

Since iron, nickel, copper, and zinc oxides and sulfides act to catalyze the decomposition of sulfur compounds occurring in petroleum, another modification of the invention is possible whereby pebbles consisting essentially of these metal oxides serve the dual function of catalyst and sulfur acceptor. These oxides may be suitably mixed either singly or in groups with a small proportion of a non-deleterious binder, such as bentonite, compressed into forms, and heat treated to produce hard, rugged pebbles. While this modification is effective in the process, it is not quite so effective as some of the other modifications recited.

A further modification entails the use of surface-oxidized pebbles of Fe, Ni, and Cu. These oxidized metal balls function effectively as both catalyst and sulfur acceptor. They are preferably etched by any conventional means as well as oxidized in order to increase the active surface. By being subjected to severe oxidizing conditions in the sulfur-removal zone during each cycle, these metal pebbles always enter the reactor with a complete coat of the oxide.

In accordance with the invention, pebbles are contacted with the gases to be desulfurized for various contact times depending upon the amount of gas thru put per unit of time, the "sourness" of the gas, and the heat requirements in the reactor. But it is undesirable to retain pebbles in the reactor until the available sulfur capacity of the pebbles is completely utilized. Under normal conditions, less than 60% of the sulfur capacity of the pebble material is used up during the flow of the pebbles thru the reactor. Reaction times usually range from about .1 second to 2 seconds.

For a more complete understanding of the invention reference is made to the accompanying drawing which shows diagrammatically one arrangement of apparatus for conveniently effecting desulfurization of petroleum gases and vapors. Chambers 11, 12, and 13 are heavily heat insulated chambers containing fluent masses of pebbles 10 and connected by conduits forming necks 14 and 15. Conduits 16 and 17 serve as pebble inlet and outlet for sulfur-removal or regeneration chamber 11 and reaction chamber 13, respectively. Conduits 19 and 21 serve as chutes for conveying pebbles to and from chambers 11 and 13 and from and to elevator 22, respectively. Star valve (or other type of pebble feeder) 23 regulates the flow of pebbles thru chambers 11, 12, and 13 and feeds the pebbles into bucket elevator 22 for delivery to chute 19 from whence they flow into chamber 11.

In operation the petroleum gases and vapors to be treated are fed into reaction chamber 13 via line 24, preferably in preheated condition. The preheating may be effected by indirect heat exchange with effluents from reaction zone 13. The feed gas passes thru reactor 13 preferably in countercurrent flow to a fluent mass of hot pebbles which enter reactor 13 via neck 15 from tempering chamber 12 and pass out thru neck 17 and is rendered relatively free from sulfur by contact with the hot catalytic and acceptor material of the pebbles. The heat of the pebbles raises the temperature of the feed gas to the desired point within the range of about 400° to 900° F. to effect a rapid removal of sulfur by decomposition of sulfur compounds and exchange of sulfur for oxygen of the metal oxide sulfur acceptor of the pebbles. The desulfurized gas leaves reactor 13 via line 25 and passes to further treating or storage means not shown. A part of the desulfurized gas may be recycled to feed line 24 via line 26 controlled by valve 27, when desired.

The pebbles emerging from reactor 13 are below the desired reaction temperature and are also partially deactivated as a sulfur acceptor. They flow by gravity thru neck 17, chute 21, and regulated star feeder 23 to elevator 22 which conveys them to chute 19 from which they flow thru inlet 16 into chamber 11. In their descent thru chamber 11, which serves as a sulfur-acceptor regenerator, the pebbles are contacted with a countercurrent stream of hot oxygen-containing gas admitted via line 28 at a temperature which effects the exchange of the sulfur of the sulfur acceptor for oxygen of said gas. Waste sulfur-bearing gas is removed via line 29.

The pebble stream emerging from chamber 11 is usually not of the required temperature for the reaction in chamber 13 and is accordingly passed thru tempering chamber 12. A heat-exchange gas which may comprise air, steam, flue gas, or mixtures thereof is introduced to chamber 12 via line 30, brings the pebbles to a predetermined temperature, and is carried away via line 31. Tempering gas may desirably be recycled via line 32 controlled by valve 33 in order to conserve heat. The pebbles at a predetermined temperature pass thru neck 15 into reactor 13 to complete an operating cycle.

It is preferred to operate at relatively low gauge pressures, e. g., about 0.5 to 3 or 4 p. s. i. g.; but other pressures may be used. By maintaining relatively equal pressures in the various chambers, escape of gases from chamber to chamber is substantially avoided. To allow for any inequalities in pressure in chambers 11, 12, 13, and the elevator system, including chutes 19 and 21, lines 34, 35, 36, and 37 are provided for the introduction of any non-deleterious blocking gas such as steam, nitrogen, etc., steam being particularly desirable in the process of the invention.

As an example of operation according to the invention, a feed consisting of natural gas containing about 200 grains of sulfur per hundred cubic feet of gas is passed thru a pebble heater reaction zone in contact with a stream of $\frac{5}{16}''$ pebbles constituted of 65% iron oxide and 35% bauxite by weight and at an entrance temperature of about 1000° F. The feet is preheated to a temperature of about 350° F. and is quickly brought up to a temperature of 750° F. in the reaction zone by regulating pebble flow rate and using a contact time of about .25 second. The pebble stream emerges from the reactor at a temperature of about 600° F. and enters the burning or regeneration zone at about 550° F. A preheated stream of air and steam (75 percent air and 25 percent steam by weight) is passed thru the regeneration zone at a sufficient rate to effect substantially complete removal of sulfur from the pebbles. The pebble stream enters the tempering zone at a temperature of 700° F. and while passing therethru is contacted with a mixture of hot air and combustion gas at a temperature of about 1200° F. and is raised thereby to a temperature of about 1000° F. for passage to the reaction zone. The effluent from the reaction zone is substantially sulfur-free.

When operating with a feed containing 600 grains of sulfur per hundred cubic feet of gaseous feed and at a reaction temperature of 750° F., pebble flow rate is increased so that the temperature of the pebble stream emerging from the reactor is about 600° F. and the reaction time is increased to .35 second. The temperature of the pebble stream emerging from the regeneration zone is 850° F., requiring a gas temperature in the tempering zone of about 1100° F. Again, the effluent from the reactor is substantially sulfur-free.

When operating with a vaporized hydrocarbon distillate containing 2000 grains of sulfur per hundred cubic feet of gaseous feed and at a reaction temperature of 750° F., a higher pebble flow rate is required to supply the required heat for the process and maintain a pebble outlet temperature of about 600° F. (using the same inlet temperature of 1000° F.). The contact time is increased to about .5 second. In burning off the sulfur from the pebbles, the temperature in the regeneration zone runs above 1200° F. unless sufficient steam is introduced with the air to prevent it. The percentage of steam in the air-steam mixture is increased and so regulated that regeneration temperatures do not substantially exceed 1200° F. The pebbles enter the tempering zone at a temperature of about 200° F. above the required inlet temperature to the reactor and are cooled to the required 1000° F. by contact with an air-flue gas mixture at about 850°. The effluent from the reactor is again substantially sulfur-free.

The process of the invention provides a number of advantages such as the continuous, uninterrupted feature of the process, the almost complete sulfur removal effected even on relatively sour feed, and the long life of the pebble material. Practically complete sulfur removal can be accounted for by the fact that the most sour gas is contacted with the cooler pebbles having lower capacity for sulfur, while the catalytic activity and sulfur accepting capacity of the pebbles contacted increases as the gas or vapor feed is sweetened on its path thru the countercurrently moving stream of pebbles. The last pebbles contacted by the hydrocarbon as it approaches the exit are freshly reactivated and have their highest desulfurizing effect.

The various modifications described provide for rather flexible operation to meet the varied conditions required in different processes. It will be understood that certain features and subcombinations may be desirable although not specifically described. This is contemplated by and is within the scope of the claims. It is also obvious that certain changes in details within the scope of the claims may be made without departing from the spirit of this invention. It is therefore to be understood that my invention is not to be unduly or unnecessarily limited to the specific details described and shown.

I claim:

1. A continuous process for desulfurizing hydrocarbon gases containing $H_2S$ and organic sulfur compounds which comprises continuously flowing by gravity a contiguous fluent mass of hot spherical pebbles comprising a catalyst which promotes decomposition of said sulfur compounds and an acceptor for sulfur thru a series of substantially vertically extending zones comprising a pebble heating and desulfuring zone, a gas-desulfurizing zone positioned at a lower level than said pebble heating and desulfuring zone, and a relatively narrow interconnecting zone, each of said zones being substantially filled with said contiguous mass of pebbles and permitting relatively unrestricted flow of pebbles therethru, regulating the flow of pebbles through said zones at a point below and externally to said gas desulfurizing zone, continuously contacting that section of said contiguous mass of pebbles flowing thru said gas-desulfurizing zone with a stream of sulfur-bearing hydrocarbon gases substantially free of gaseous oxidant whereby said gases are heated to a temperature of between about 400° and 900° F. solely by heat exchange with said pebbles and substantially desulfurized and whereby said pebbles are sulfurized, continuously contacting that section of said contiguous mass of pebbles flowing thru said heating and desulfuring zone with a stream of oxygen-containing gas at a temperature of between about 750° and 1200° F. and at a flow rate regulated to insure heating of said pebbles to a temperature substantially above a predetermined gas-desulfurizing temperature and to insure substantial removal of sulfur from said pebbles, continuously removing pebbles from the lower portion of said gas-desulfurizing zone, continuously introducing pebbles to the upper portion of said pebble heating and desulfuring zone, and recovering the desulfurized gases.

2. The process of claim 1 in which the pebbles comprise surface-oxidized metal balls of the class consisting of Fe, Ni, and Cu.

3. The process of claim 1 in which the pebbles comprise at least one oxide from the group of metals consisting of Fe, Ni, Cu, and Zn and function as both catalyst and sulfur acceptor.

4. The process of claim 1 in which the pebbles comprise a mixture of aluminous material and at least one oxide of the group of metals consisting of Fe, Ni, Cu, Cd, Zn, Ca, Ba, Mg, Na, and K.

5. The process of claim 1 in which the pebbles comprise a mixture of bauxite and at least one oxide of the group of metals consisting of Fe, Ni, Cu, Cd, Zn, Ca, Ba, Mg, Na, and K.

6. The process of claim 1 in which the pebbles comprise bauxite containing a substantial amount of iron oxide.

7. The process of claim 1 in which the oxygen-containing gas comprises a mixture of air and steam.

8. The process of claim 1 in which the oxygen-containing gas comprises air.

9. A continuous process for desulfurization of industrial gases containing $H_2S$ and organic sulfur compounds which comprises continuously contacting said gases in the absence of added gaseous oxidant in a reaction zone with a stream of hot spherical pebbles comprising a catalyst which promotes decomposition of said sulfur compounds and an acceptor for sulfur whereby said gases are heated to a temperature of between about 400° and 900° F. solely by heat exchange with said pebbles and substantially desulfurized and whereby said pebbles are sulfurized and coated, transferring said pebbles to a higher zone, flowing said pebbles by gravity thru said higher zone in contact with a stream of oxygen-containing gas at a temperature of between 750° and 1200° F. thereby substantially desulfurizing and heating said pebbles, flowing said pebbles by gravity thru a separate intermediate zone while adjusting the temperature of said pebbles to that required in said reaction zone by contacting said pebbles with a heat-transfer gas of suitable temperature, flowing said stream of pebbles into the reaction zone to complete a cycle of operation, maintaining the stream of pebbles contiguous and compact from the upper portion of said higher zone to the bottom of said reaction zone, and recovering the desulfurized gases.

10. A continuous process for desulfurizing industrial sulfur-bearing gases which comprises continuously flowing by gravity a contiguous fluent mass of hot pebbles comprising a catalyst which promotes decomposition of said sulfur compounds and an acceptor for sulfur thru a series of substantially vertically extending zones comprising a pebble heating and desulfuring zone, a gas-desulfurizing zone positioned at a lower level than said pebble heating and desulfuring zone, and a separate pebble tempering zone positioned intermediate said previously named zones and communicating therewith thru relatively narrow zones, each of said zones being substantially filled with said contiguous mass of pebbles and permitting relatively unrestricted flow of pebbles therethru, continuously contacting that section of said contiguous mass of pebbles flowing thru said gas-desulfurizing zone with a stream of sulfur-bearing industrial gases free of added gaseous oxidant whereby said gases are heated to a temperature of between about 400° and 900° F. solely by heat exchange with said pebbles and substantially desulfurized and whereby said pebbles are sulfurized, continuously contacting that section of said contiguous mass of pebbles flowing thru said heating and desulfuring zone with a stream of oxygen-containing gas at a temperature of between about 750° and 1200° F. and at a flow rate regulated to insure substantial removal of sulfur from said pebbles and cooling thereof, continuously contacting that section of said contiguous mass of pebbles flowing thru said pebble tempering zone with a stream of heat-transfer gas at a temperature and flow rate regulated to insure adjustment of pebble temperature to that suitable for maintaining a predetermined gas-desulfurizing temperature, continuously removing cooled pebbles from the lower portion of said gas-desulfurizing zone, continuously introducing pebbles to the upper portion of said pebble heating and desulfuring zone, and recovering the desulfurized gases.

SAM P. ROBINSON.

REFERENCES CITED

The following references are of record in the file of this patent:

UNITED STATES PATENTS

| Number | Name | Date |
| --- | --- | --- |
| 1,895,724 | Miller et al. | Jan. 31, 1933 |
| 2,083,894 | Connolly | June 15, 1937 |
| 2,418,679 | Utterback | Apr. 8, 1947 |
| 2,419,508 | Simpson et al. | Apr. 22, 1947 |